United States Patent [19]
Kia

[11] Patent Number: 4,675,231
[45] Date of Patent: Jun. 23, 1987

[54] MOLDABLE AND FOAMABLE REINFORCED LAMINATE AND PROCESS OF MAKING SAME

[75] Inventor: Hamid G. Kia, Utica, Mich.

[73] Assignee: General Motors Corporation, Detroit, Mich.

[21] Appl. No.: 884,786

[22] Filed: Jul. 11, 1986

[51] Int. Cl.⁴ ............................................... B32B 5/28
[52] U.S. Cl. ..................................... 428/285; 156/79; 428/317.9
[58] Field of Search ................... 428/285, 307.3, 317.9; 156/79

[56] References Cited

U.S. PATENT DOCUMENTS

| | | | |
|---|---|---|---|
| 3,533,901 | 10/1970 | Sutker | 428/317.1 |
| 3,554,851 | 1/1971 | Modigliani | 428/112 |
| 4,175,155 | 11/1979 | Biranowski et al. | 428/316.6 |
| 4,346,133 | 8/1982 | Hipchen et al. | 428/317.9 |
| 4,386,983 | 6/1983 | Hipchen et al. | 428/317.9 |

FOREIGN PATENT DOCUMENTS 1168778  10/1969  United Kingdom ............. 428/317.9

Primary Examiner—William J. Van Balen
Attorney, Agent, or Firm—Randy W. Tung

[57] ABSTRACT

A laminated foamable and moldable sheet which contains a solid catalyst that is activated at the molding temperature of the laminate.

8 Claims, No Drawings

MOLDABLE AND FOAMABLE REINFORCED LAMINATE AND PROCESS OF MAKING SAME

FIELD OF THE INVENTION

The present invention generally relates to a laminated foamable and moldable sheet and, more particularly, is concerned with a laminated foamable and moldable sheet which contains a solid catalyst that is activated at the molding temperature of the laminate.

BACKGROUND OF THE INVENTION

Glass fiber reinforced lightweight plastic panels have found many applications in the automotive industry in recent years. These include the use of either short glass fibers or long strands of glass fibers. In the application of short glass fibers, both milled and chopped glass fibers are used for the reinforcement of thermoplastics or thermosets. On the other hand, long glass fiber strands are frequently used in the form of glass fiber mats. These mats can be used as reinforcement in a plastic part by either injection molding a thermoplastic material or a RIM (reaction injection molding) type thermoset material into it.

Glass fiber mat reinforced plastic panels can be used in either interior applications or exterior applications on an automobile. For instance, they can be used as load floors or seat backs in interior applications or as body panels in exterior applications. The rigidity and strength of a glass fiber mat reinforced plastic panel are superior when compared to their steel counterparts. However, one drawback of these type of reinforced panels is that even though lighter than steel, their weight is still substantial because of the density of the thermoplastic or thermoset material used. This high density becomes more of a problem in some applications where both high strength and lightweight qualities are desired. For instance, in the application of an automobile headliner or interior door trim panels, a candidate material must have both the rigidity and the lightweight properties.

Many interior trim panels used in an automobile require shaping in a forming process. An ideal candidate for such applications should also be easily shapable or formable.

It is therefore an object of the present invention to provide a laminated foamable and moldable sheet which can be molded into glass fiber mat reinforced low density foam panels.

It is another object of the present invention to provide a laminated foamable and moldable sheet to make lightweight automotive trim panels.

It is yet another object of the present invention to provide a laminated foamable and moldable sheet which readily expands in a heated mold to assume the shape of a mold cavity.

SUMMARY OF THE INVENTION

In accordance with four preferred embodiments of the present invention, a laminated foamable and moldable sheet may be prepared by the following operative steps. First, a multiplicity of glass fibers are wetted with a composition of liquid urethane foam precursors containing a solid catalyst. These wetted glass fibers are then positioned between two layers of barrier sheet. A suitable pressure is then used to compact the wetted glass fibers between the two layers of barrier sheet and making it a laminate.

One critical requirement for my novel invention is that the laminate must contain a solid catalyst. This solid catalyst can only be activated to rapidly foam the laminate when it is heated in a molding press to a temperature higher than its melting point. This makes a long shelf life of anywhere between several hours to several weeks possible for my foamable laiminate, as long as it is kept at a temperature between 5° C. to 20° C.

DETAILED DESCRIPTION OF THE INVENTION

A glass fiber mat reinforced foamable and moldable polyurethane laminate which can be used to mold door trim panels, interior lining panels, and headliners in an automobile is described herein.

I shall demonstrate the preparation of a soft polyurethane foamable laminate containing 50% hard segment which can be used in molding an automobile headliner. I shall also demonstrate the preparation of a hard polyurethane foamable laminate containing 75% hard segment which can be used in molding automobile interior door panels. It should be noted that the stiffness of a product can be easily changed to meet the design requirements by adjusting the hard segment content of the polyurethane resin. Two other polyurethane formulations which utilize a solid chain extender are also disclosed. These two formulations produce laminates having significantly extended shelf life.

For reinforcement, a continuous glass fiber mat supplied by the Owens Corning Fiberglass Co. (OCF-8610) was chosen. I have discovered that this type of glass fiber mat provides better moldability and more even foaming. These processing advantages stem from the fact that the fiber strands are not heavily sized to each other and as a result they can be stretched and formed to various geometries without tear. I have discovered that the amount of glass fibers used is also an important factor to be considered. This is because the fibers provide stiffness and integrity and yet if used in excess they interfere with the foaming process and increase the density of the molded part. In the present invention, I have determined that 25% by weight glass fibers is an optimum glass content for providing sufficient rigidity while allowing for even foaming of the polyurethane resin.

My novel foamable polyurethane laminates based on the four different formulations are prepared by the following procedure. Glass fiber mats are first wetted with a polyurethane resin, wrapped between two barrier sheet layers, compressed and then cut to a desirable size such that they can be molded at a later time. The shelf life of these laminated foamable sheets is an important consideration in the practice of my invention. I have found that by suitably selecting the type of catalysts and chain extenders, the shelf life of a foamable laminate prepared by my technique can be extended to as long as several weeks.

The barrier sheets used in the present invention are inexpensive papers that can be molded along with the mat and the resin. Barrier sheets of other materials may also be suitably used. My foamable laminate may be easily handled and cut to any size desired for storage. Because of the nature of glass fiber mat used, 100% mold coverage should be used for the size of a charge.

A three component polyurethane composition was used in my invention. These three components are a polyol, an isocyanate, and a chain extender. To prevent the occurrence of fast foaming reaction at room temperature, a solid catalyst in the form of powder is used. This catalyst is zinc stearate which has a solid-to-liquid melting point of 250° F. I believe that any other catalyst that is a solid at room temperature and has a melting point higher than room temperature should work equally well. The chemicals used in the present invention and their commercial sources are identified as follows. Isonate 181 which is a diphenylmethane diisocyanate having an equivalent weight of 183.3 was supplied by the Dow Chemical Co. Niax 1134 is a primary polyether triol having an equivalent weight of 1516.2 was supplied by the Union Carbide Corp. Pluracol PEP 550 which is a secondary polyether tetrol having an equivalent weight of 137.5 was supplied by the BASF Wyandotte Co. Hydroquinone di-2-hydroxyethylether (HQHE) is a solid chain extender which melts at 70° C. Glass Fiber M-8610 which is a continuous glass fiber mat having a 1 oz/ft$^2$ density composed of one inch long chopped glass rovings was supplied by Owens Corning Fiberglass Corp. The barrier sheets used in the present invention is a common wrapping paper having 4 gms/ft$^2$ density.

EXAMPLE 1

A soft polyurethane foamable laminate

The formulation I used for a soft polyurethane sample headliner is shown in TABLE I.

TABLE I

| Formulation for Soft Polyurethane | |
|---|---|
| Component | Weight, Grams |
| Polyol (Niax 1134) | 50.0 |
| Isocyanate (Upjohn, Isonate 181) | 47.0 |
| Ethylene glycol (grade AR) | 6.0 |
| Zinc Stearate | 1.0 |
| Water | 1.0 |

Two 12×12" paper sheets are placed on a bench, a thin layer of soft polyurethane resin composition is spread over the paper sheets at a coverage of approximately 20 gms/ft$^2$ A glass fiber mat is cut to 12"×12" dimension and placed between the two paper sheets such that the resin coated side is on the inside of the laminate. A roller is then used to compact the laminated sheet to allow complete wetting of the fibers.

The shelf life of my soft polyurethane foamable laminate is approximately two hours during which a panel may be molded.

In an alternate process, a piece of decorative cloth is placed on one side of the sandwiched structure in the laminating process. The laminae can then be used to mold a foam panel having a pre-decorated surface.

EXAMPLE 2

A rigid polyurethane foamable laminate

To make a substrate for an automotive interior door panel, a rigid polyurethane resin formulation as that shown in TABLE II is used.

TABLE II

| Formulation for Rigid Polyurethane | |
|---|---|
| Component | Weight, Grams |
| Polyol (BASF, Pluracol PEP 550) | 24.0 |
| Isocyanate (Upjohn, Isonate 181) | 76.0 |
| Ethylene glycol (grade AR) | 6.0 |
| Zinc Stearate | 1.0 |

TABLE II-continued

| Formulation for Rigid Polyurethane | |
|---|---|
| Component | Weight, Grams |
| Water | 1.0 |

Two 30×40 inch plastic sheets of Mylar of 0.005 inch thick were placed on a bench and a thin layer of rigid polyurethane composition applied on the sheets at a coverage of 20 gms/ft$^2$. Chopped glass fiber roving of one inch in length is then sprinkled on the sheets at a coverage of 14 gms/ft$^2$. These chopped glass fibers are used to increase the rigidity of the foamable laminate and the resulting foamed panel. Next, a 30×40" glass fiber mat is placed on one of the plastic sheets and the other sheet is then placed on top of the glass mat such that the resin coated sides are on the inner side. A roller is used to compact the laminated sheet to a thickness of approximately 2.5 mm thick.

The shelf life of this rigid urethane foamable laminate is approximately one hour during which a foam panel may be molded.

In an alternate process, a piece of decorative cloth is placed on the laminate during the laminating process. The laminate can be used to mold a door panel having a decorative cloth on one side.

To further improve the rigidity of the part molded, I have discovered that two approaches may be used. First, the amount of the urethane resin may be increased. This leads to a part with a heavier density and thus a part with a more rigid structure. Another approach is to mold the part in a cavity with built-in ribs. A ribbing structure added on the back of a door panel part greatly improves its rigidity.

The shelf life of our laminated sheet prior to molding is between one to two hours using the composition described herein. To further improve the shelf life of my laminated sheets, I have used two other formulations. In these two alternate formulations, I replaced the liquid ethylene glycol chain extender with a solid hydroquinone di-2-hydroxyethylether (HQEE) chain extender. This alternate chain extender is a solid at room temperature and melts to a liquid at 70° C. The chain extenders are used in my urethane formulation to increase the rigidity and to increase the reactivity of the systems. I have found that by switching the chain extender from a liquid to a solid, the shelf life of my laminated sheet is increased from two hours to approximately four weeks.

EXAMPLE 3

A soft polyurethane foamable laminate having extended shelf life

TABLE III

| Component | Weight, Grams |
|---|---|
| Polyol (Niax 1134) | 50 |
| Isocyanate (Upjohn, Isonate 181) | 47 |
| HQEE | 18 |
| Zinc Stearate | 1 |
| Water | 1 |

In this preparation, lumps of HQEE are first dissolved in polyol at 100° C. under agitation. The solid-to-liquid melting point of HQEE is 70° C. The solution is then cooled to room temperature and mixed with isocyanate to prepare foamable laminates.

When kept at room temperature, the shelf life of these laminates is extended from two hours (Example 1) to at least 24 hours. When the foamable laminates are kept at refrigerated temperature, their shelf life may be extended to as long as four weeks.

FORMULATION 4

A rigid polyurethane foamable laminate having extended shelf life

TABLE IV

| Component | Weight, Grams |
| --- | --- |
| Polyol (BASF, Pluracol PEP 550) | 48 |
| Isocyanate (Upjohn, Isonate 181) | 152 |
| HQEE | 6 |
| Zinc Stearate | 1 |
| Water | 1 |

In this preparation, lumps of HQEE are first dissolved in polyol at 100° C. under mechanical agitation. The solution is then cooled to room temperature, mixed with isocyanate, and used in the preparation of foamable laminates. Procedures similar to that used in Example 2 were followed in making the laminates.

I have discovered that the shelf life of my laminates prepared in Example 4 was extended to 24 hours at room temperature, and to one month at a refrigerated temperature of 5° C.

While my invention has been described in terms of four preferred embodiments thereof, it is to be appreciated that those skilled in the art will readily apply these teachings to other possible variations of the invention.

The embodiments of the invention in which an exclusive property or privilege is claimed are defined as follows:

1. The method of making a moldable and foamable reinforced plastic laminate by compressing glass fibers wetted with a composition of urethane foam precursors containing a solid catalyst between two layers of barrier sheets, said method comprising the steps of:
   (1) wetting a multiplicity of glass fibers with a composition of urethane foam precursors containing a solid catalyst,
   (2) positioning said wetted glass fibers between two layers of barrier sheet,
   (3) compressing under suitable pressure said wetted glass fibers between said layers of barrier sheet into a laminate.

2. The method of making a moldable and foamable reinforced plastic laminate by compressing glass fibers wetted with a composition of urethane foam precursors containing a solid catalyst between two layers of barrier sheets, said method comprising the steps of:
   (1) wetting a multiplicity of glass fibers with a composition of urethane foam precursors containing a catalyst, said catalyst being a solid at room temperature and having a melting temperature higher than 100° F.,
   (2) positioning said wetted glass fibers between two layers of barrier sheet,
   (3) compressing under suitable pressure said wetted glass fibers between said layers of barrier sheet into a laminate.

3. The method of making a moldable and foamable reinforced plastic laminate by compressing a glass fiber mat wetted with a composition of urethane foam precursors containing a solid catalyst between two layers of barrier sheets, said method comprising the steps of:
   (1) wetting a glass fiber mat with a composition of urethane foam precursors containing a solid catalyst,
   (2) positioning said wetted glass fiber mat between two layers of barrier sheet,
   (3) compressing under suitable pressure said wetted glass fiber mat between said layers of barrier sheet into a laminate.

4. The method of making a moldable and foamable reinforced plastic laminate by compressing a glass fiber mat wetted with a composition of urethane foam precursors containing a solid catalyst between two layers of barrier sheets, said method comprising the steps of:
   (1) wetting a glass fiber mat with a composition of urethane foam precursors containing a catalyst, said catalyst being a solid at room temperature and having a melting temperature higher than 100° F.,
   (2) positioning said wetted glass fiber mat between two layers of barrier sheet,
   (3) compressing under suitable pressure said wetted glass fiber mat between said layers of barrier sheet into a laminate.

5. A foamable and moldable reinforced plastic laminate comprising two barrier sheets and a multiplicity of glass fibers wetted with a composition of urethane foam precursors containing a solid catalyst.

6. A foamable and moldable reinforced plastic laminate comprising two barrier sheets and a multiplicity of glass fibers wetted with a composition of urethane precursors containing a catalyst, said catalyst being a solid at room temperature and having a melting temperature higher than 100° F.

7. A foamable and moldable reinforced plastic laminate prepared by the process of claim 3.

8. A foamable and moldable reinforced plastic laminate prepared by the process of claim 4.

* * * * *